Jan. 18, 1944. J. E. McDONALD 2,339,416
DUST CONCENTRATOR
Filed Feb. 14, 1941

Inventor
JOHN E. McDONALD
By Robert J. Palmer
Attorney

Patented Jan. 18, 1944

2,339,416

UNITED STATES PATENT OFFICE 2,339,416

DUST CONCENTRATOR

John E. McDonald, New Rochelle, N. Y., assignor to B. F. Sturtevant Company, Boston, Mass.

Application February 14, 1941, Serial No. 378,953

2 Claims. (Cl. 183—75)

This invention relates to apparatus for the removal of solid particles from gases and relates more particularly to concentrators for concentrating and collecting cinders from the flue gases of steam power plants.

Cinder collectors commonly include primary and secondary equipment, the primary collector concentrating dust particles in a small percentage of the total gas volume and the secondary collector removing the dust. In prior collectors the primary and secondary equipment were separate and connected by duct work.

This invention provides primary and secondary collectors embodied in one structure resulting in a less expensive, more compact equipment.

A feature of the invention resides in including a secondary cyclone collector within a primary collector.

An object of the invention is to reduce the size of concentrators and collectors.

The invention will now be described with reference to the drawing, of which:

Figure 1:
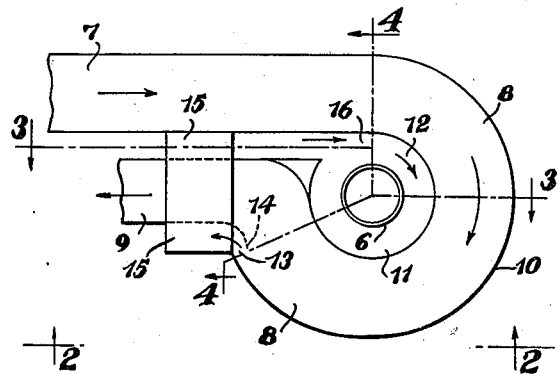
Fig. 1 is a plan view looking downwardly upon a collector embodying this invention.

The invention will now be described as embodied in a cinder concentrator and collector for steam power plants. A fan (not shown) has its suction side connected to the outlet stack 6, and provides suction for drawing the cinder laden flue gases, at high velocity, into and through the apparatus.

The flue gases under the pressure from the plant fan system, enter the inlet 7, pass through the primary collector indicated generally by 8 and leave through the outlet 9. The primary collector 8 is formed between the outer curved walls 10 and the walls 11 of the secondary cyclone collector 12, and as the gas travels through it, the cinders are thrown out by centrifugal force against the inner surface of the outer wall 10, and an estimated 90% of the cinders with of course, some gas, enters the shave-off passage 13 formed by the inwardly extending skimmer lip 14. The remaining gas and cinders pass from the collector through the outlet 9.

Figure 2:
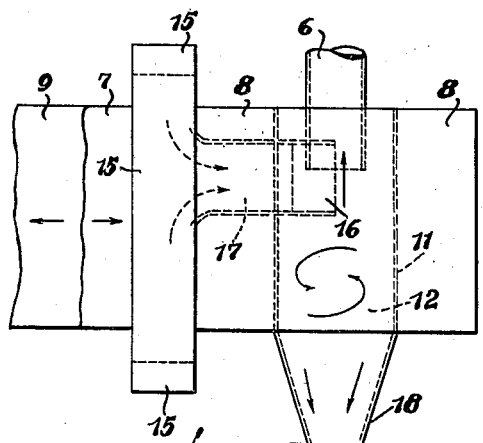
Fig. 2 is an elevation view taken along the lines 2—2 of Fig. 1.
Figure 4:
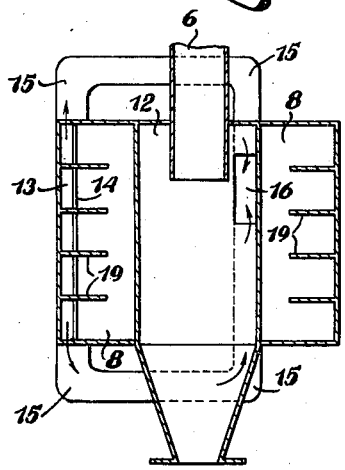
Fig. 4 is a sectional view taken along the lines 4—4 of Fig. 1.
Figure 3:
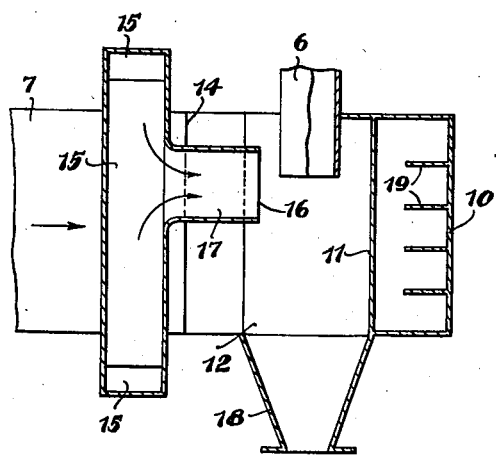
Fig. 3 is a sectional view taken along the lines 3—3 of Fig. 1.

The cinders and gas from the passage 13 pass into the passage 15 which extends upwardly and downwardly from the passage 13 and above and below the primary collector 8 and connects through the horizontal passage 17 as shown most clearly by Figs. 2 and 4, with the tangential inlet 16 to the secondary collector 12.

The gas and cinders entering the secondary cyclone collector 12 through the tangential inlet 16 pass spirally around and down the secondary collector, the dust and cinders being thrown out by centrifugal force to pass by gravity through the converging outlet 18 for disposal. The clean gas passes through the outlet stack 6 and is preferably recirculated through the collector by connection of the discharge side of the fan associated with the collector, to the inlet 7 into the primary collector 8.

The horizontal baffles 19 in the primary collector 8 cause the gas and cinders to flow in horizontal paths which prevents undesired turbulence and thereby causes more effective separation.

The invention is seen to provide an efficient compact two stage collector including a secondary cyclone collector within a primary cyclone collector.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. A dust collector comprising a substantially vertically extending primary separator having walls forming substantially horizontal gas inlet and gas outlet passages at one side thereof, and forming a curved gas flow passage between said inlet and outlet passages, means forming a tangential skimming passage extending into the outer periphery of said flow passage adjacent said outlet passage, for skimming off the dust there concentrated by centrifugal force, a secondary separator having a tangential inlet passage and having a substantially vertically extending dust free gas outlet, within said primary separator, inner walls of said flow passage forming walls of said secondary separator, and means forming a passage connecting said skimming passage and said tangential inlet passage for conveying the skimmed off gas and dust into said secondary separator.

2. A dust collector comprising a substantially vertically extending primary separator having walls forming substantially horizontal, spaced, parallel, gas inlet and gas outlet passages at one side thereof, and forming a curved gas flow passage between said inlet and outlet passages, means forming a tangential skimming passage extending into the outer periphery of said flow passage adjacent said outlet passage, for skimming off the dust there concentrated by centrifugal force, a secondary separator having a tangential inlet passage in the space between said parallel gas inlet and gas outlet passages and having a substantially vertically extending dust free gas outlet, within said primary separator, inner walls of said flow passage forming walls of said secondary separator, and means forming a passage connecting said skimming passage and said tangential inlet passage for conveying the skimmed off gas and dust into said secondary separator.

JOHN E. McDONALD.